(12) United States Patent
Tamura et al.

(10) Patent No.: US 12,712,193 B2
(45) Date of Patent: Aug. 18, 2026

(54) FUEL CELL SYSTEM

(71) Applicant: HONDA MOTOR CO., LTD., Tokyo (JP)

(72) Inventors: Takuya Tamura, Wako (JP); Tomoyuki Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 751 days.

(21) Appl. No.: 18/127,098

(22) Filed: Mar. 28, 2023

(65) Prior Publication Data

US 2023/0318005 A1 Oct. 5, 2023

(30) Foreign Application Priority Data

Mar. 30, 2022 (JP) ................................ 2022-055004

(51) Int. Cl.

| | |
|---|---|
| ***H01M 8/2465*** | (2016.01) |
| ***H01M 8/04007*** | (2016.01) |
| ***H01M 8/0432*** | (2016.01) |
| ***H01M 8/1004*** | (2016.01) |
| ***H01M 8/1018*** | (2016.01) |

(52) U.S. Cl.
CPC ..... *H01M 8/2465* (2013.01); *H01M 8/04007* (2013.01); *H01M 8/0432* (2013.01); *H01M 8/1004* (2013.01); *H01M 8/1018* (2013.01)

(58) Field of Classification Search
CPC ........... H01M 8/2465; H01M 8/04007; H01M 8/0432; H01M 8/1004; H01M 8/1018; H01M 8/04768; H01M 8/0258; H01M 8/0267; H01M 8/04014; H01M 8/04029; H01M 8/04358; H01M 8/241; H01M 8/04417; H01M 8/04723
See application file for complete search history.

(56) References Cited

U.S. PATENT DOCUMENTS

| | | | | |
|---|---|---|---|---|
| 2009/0123783 A1* | 5/2009 | Schrieber | ............ | H01M 8/0662 429/432 |
| 2016/0133971 A1 | 5/2016 | Naganuma et al. | | |

(Continued)

FOREIGN PATENT DOCUMENTS

| | | |
|---|---|---|
| CN | 105591126 A | 5/2016 |
| JP | 2007-018831 A | 1/2007 |

(Continued)

OTHER PUBLICATIONS

Office Action dated Jan. 6, 2024 issued in the corresponding Chinese Patent Application No. 202310304143.0 with an English machine translation thereof.

*Primary Examiner* — Matthew W Van Oudenaren
(74) *Attorney, Agent, or Firm* — Carrier, Shende & Associates P.C.; Joseph P. Carrier; Jeffrey T. Gedeon

(57) ABSTRACT

If a medium outlet temperature of a heat exchange medium is not less than a threshold temperature, the heat exchange medium is supplied to a medium flow field of a fuel cell stack at a predetermined flow rate, and if the medium outlet temperature is less than the threshold temperature, in correspondence with the decrease of a medium outlet temperature, the heat exchange medium is supplied to the medium flow field at a flow rate decreased from the predetermined flow rate so as to prevent increase in the differential pressure between an anode flow field and the medium flow field in the fuel cell stack.

2 Claims, 7 Drawing Sheets

(56) References Cited

U.S. PATENT DOCUMENTS

| | | | | |
|---|---|---|---|---|
| 2016/0149238 | A1* | 5/2016 | Lee | H01M 8/04067 429/437 |
| 2017/0250426 | A1* | 8/2017 | Hamachi | H01M 8/04228 |
| 2018/0226665 | A1 | 8/2018 | Oyama et al. | |

FOREIGN PATENT DOCUMENTS

| | | | |
|---|---|---|---|
| JP | 2012-069333 | A | 4/2012 |
| JP | 2014-127452 | A | 7/2014 |
| JP | 2018-125258 | A | 8/2018 |

* cited by examiner

MOTOR
DRIVE UNIT
CONTROL DEVICE
POWER SW
INJ
HUM
RADIATOR
WP
CP
AFS
Vfc
Ifc
(air)
(cla)
(H2)

50
52
58
air
53
H2
59
54
60
cla
57a
57b
56b
56a
57
55
56

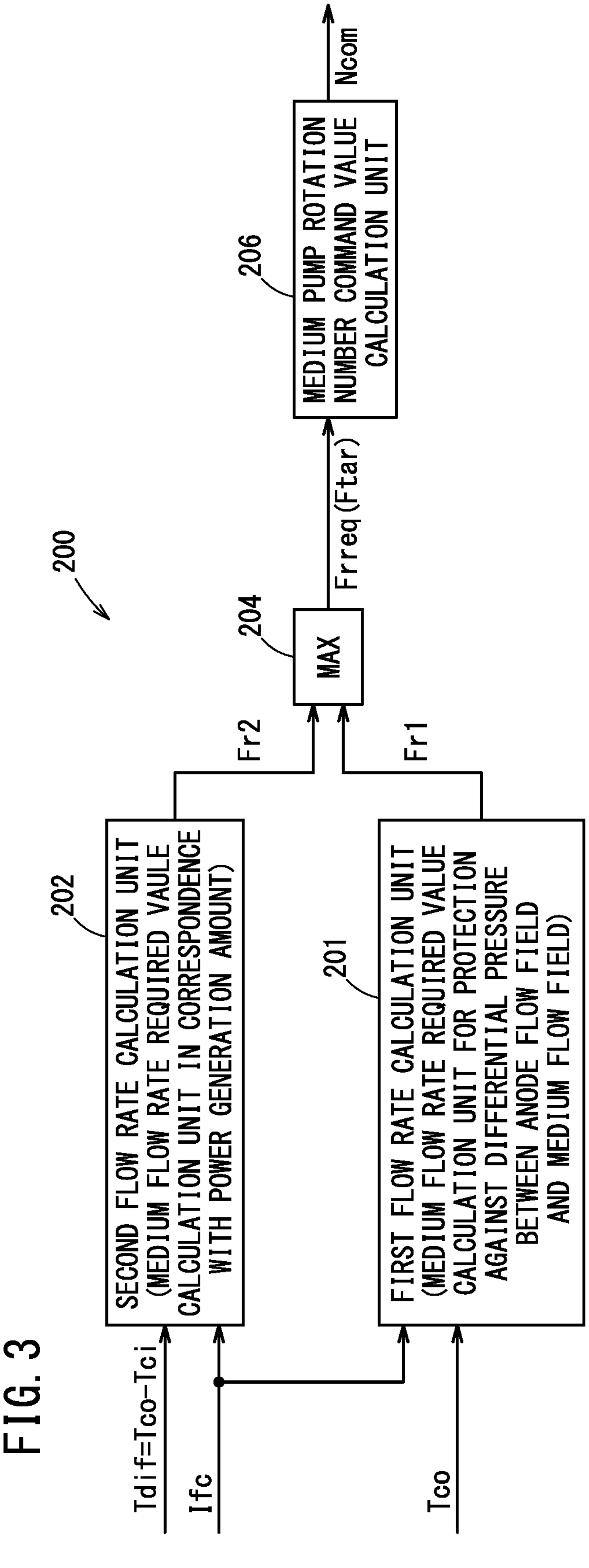
FIG. 3
200
Tdif=Tco−Tci
Ifc
Tco
202
SECOND FLOW RATE CALCULATION UNIT (MEDIUM FLOW RATE REQUIRED VAULE CALCULATION UNIT IN CORRESPONDENCE WITH POWER GENERATION AMOUNT)
201
FIRST FLOW RATE CALCULATION UNIT (MEDIUM FLOW RATE REQUIRED VALUE CALCULATION UNIT FOR PROTECTION AGAINST DIFFERENTIAL PRESSURE BETWEEN ANODE FLOW FIELD AND MEDIUM FLOW FIELD)
Fr2
Fr1
204
MAX
Frreq(Ftar)
206
MEDIUM PUMP ROTATION NUMBER COMMAND VALUE CALCULATION UNIT
Ncom Ifc
Pth
Pin
Tmax
Tco
Tth
Nmax
Ncom
Nreq
SELECTED FLOW RATE
Ncom(Fr2)
Ncom(Fr1)
Fr1
t0
t1
t2
t3
t4
t5
t6
t7

Ifc
Pth
Pin
Tmax
Tco
Tth
Nmax
Ncom
Nreq
SELECTED FLOW RATE
Ncom(Fr2)
Ncom(Fr1)
Fr2
Fr1
Fr2
t0
t1
t2
t3
t4
t5
t6
t7

FUEL CELL SYSTEM

CROSS-REFERENCE TO RELATED APPLICATIONS

This application is based upon and claims the benefit of priority from Japanese Patent Application No. 2022-055004 filed on Mar. 30, 2022, the contents of which are incorporated herein by reference.

BACKGROUND OF THE INVENTION

Field of the Invention

The present invention relates to a fuel cell system including a fuel cell stack. The fuel cell stack is formed by stacking a plurality of power generation cells together. Each of the power generation cells includes a membrane electrode assembly and separators sandwiching the membrane electrode assembly. The membrane electrode assembly includes a cathode, an anode, and a solid polymer electrolyte membrane interposed between the cathode and the anode.

Description of the Related Art

In recent years, research and development have been conducted on fuel cells (FC) that contribute to energy efficiency in order to ensure that more people have access to affordable, reliable, sustainable and modern energy.

For example, JP 2014-127452 A discloses a fuel cell system in which the anode pressure of a fuel cell stack is increased together with an increase in the rotation speed of a circulation pump of a medium for preventing the pressure in an anode flow field in the fuel cell stack from becoming lower than the pressure in a coolant water flow field, so as to improve the durability of a water circulation channel outside the fuel cell stack (paragraph 0093 of JP 2014-127452 A). An example of a power generation cell of a solid polymer electrolyte fuel cell is shown in a cross sectional view in FIG. 2 of JP 2018-125258 A.

SUMMARY OF THE INVENTION

In the fuel cell stack, it is required prevent increase in the differential pressure between the pressure in the anode flow field and the pressure in the medium flow field in the fuel cell stack so as to prevent damage of the fuel cell stack itself.

However, J P 2014-127452 A does not disclose any protection of the fuel cell stack against the differential pressure between the anode flow field and the medium flow field in the fuel cell stack. An object of the present invention is to solve the above problem.

A fuel cell system according to an aspect of the present invention includes a fuel cell stack including a plurality of stacked power generation cells. Each of the power generation cells includes a membrane electrode assembly and separators sandwiching the membrane electrode assembly. The membrane electrode assembly includes a cathode, an anode, and a solid polymer electrolyte membrane interposed between the cathode and the anode. An anode flow field configured to allow a fuel gas to flow along the anode, a cathode flow field configured to allow an oxygen-containing gas to flow along the cathode, and a medium flow field configured to allow a heat exchange medium to flow adjacent to the anode flow field and the cathode flow field, are formed in the separators. The fuel cell system further includes a medium supply apparatus configured to supply the heat exchange medium to the medium flow field in the fuel cell stack through a medium inlet pipe, and collect and cool the heat exchange medium which flowed inside the fuel cell stack through a medium outlet pipe, a temperature acquisition unit configured to obtain a temperature of the heat exchange medium in the medium outlet pipe or a temperature correlated with the temperature of the heat exchange medium in the medium outlet pipe as a medium outlet temperature, and a control device configured to control the medium supply apparatus. The control device is configured to, if the medium outlet temperature is not less than a threshold temperature, supply the heat exchange medium to the medium flow field at a predetermined flow rate, and if the medium outlet temperature is less than the threshold temperature, decrease the predetermined flow rate in correspondence with the decrease of the medium outlet temperature and supply the heat exchange medium to the medium flow field at a flow rate decreased from the predetermined flow rate.

In the present invention, if the medium outlet temperature of a heat exchange medium is not less than the threshold temperature, the heat exchange medium is supplied to the medium flow field of the fuel cell stack at the predetermined flow rate, and if the medium outlet temperature is less than the threshold temperature, in correspondence with the decrease of the medium outlet temperature, the heat exchange medium is supplied to the medium flow field at a flow rate decreased from the predetermined flow rate. In this manner, it is possible to prevent increase in the differential pressure between an anode flow field and the medium flow field to properly protect the fuel cell stack.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a functional block diagram showing a medium supply apparatus control unit in a control device;

DETAILED DESCRIPTION OF THE INVENTION

Embodiments

[Structure]

Figure 1:
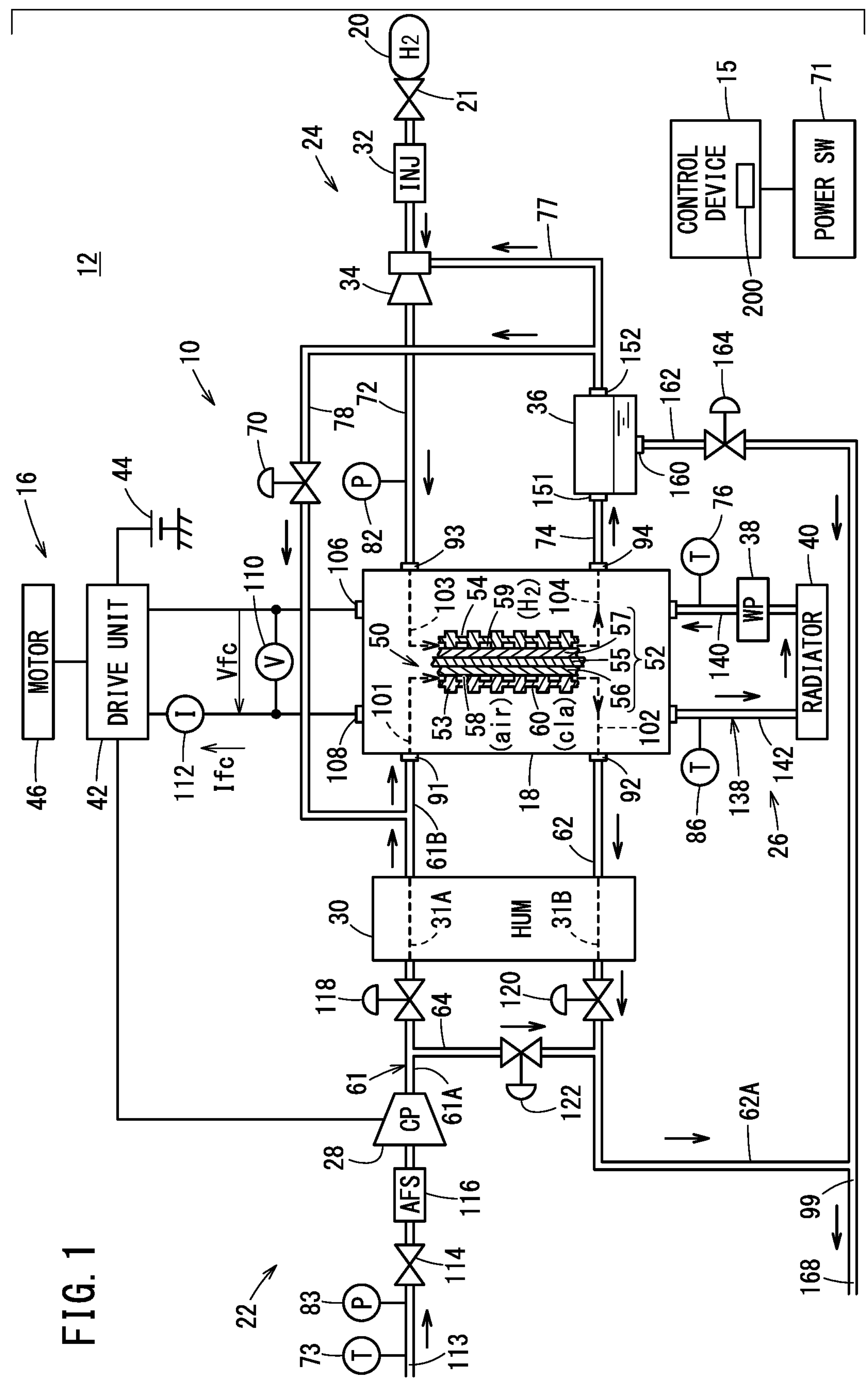
FIG. 1 is a structural diagram schematically showing a fuel cell vehicle including a fuel cell system according to an embodiment of the present invention.

FIG. 1 is a structural diagram schematically showing a fuel cell vehicle 12 including a fuel cell system 10 according to an embodiment of the present invention.

The fuel cell system 10 can be incorporated into other movable elements such as ships, airplanes, robots other than the fuel cell vehicle 12.

The fuel cell vehicle 12 includes a control device 15 for controlling the entire fuel cell vehicle 12, the fuel cell system 10, and an output unit 16 electrically connected to the fuel cell system 10.

The control device 15 need not necessarily be just one control device. Two or more control devices, e.g., for the fuel cell system 10 and for the output unit 16 may be provided.

The fuel cell system 10 includes a fuel cell stack (hereinafter also simply referred to as the fuel cell) 18, a hydrogen tank 20, an oxygen-containing gas supply apparatus 22, a fuel gas supply apparatus 24, a medium supply apparatus (heat exchange medium supply apparatus) 26.

The oxygen-containing gas supply apparatus 22 includes a compressor (CP) 28 and a humidifier (HUM) 30.

The fuel gas supply apparatus 24 includes a shutoff valve 21, an injector (INJ) 32, an ejector 34, and a gas liquid separator 36. The injector 32 may be replaced with a pressure reducing valve.

The medium supply apparatus 26 includes a medium pump (WP) 38 and a radiator 40.

The output unit 16 includes a drive unit 42, a high voltage energy storage device (battery) 44, and a motor (electric motor) 46. The loads of the drive unit 42 include, in addition to the motor 46 as a main device, auxiliary devices such as the compressor 28, the medium pump 38, and an air conditioner (not shown).

It should be noted that the direct current voltage (high voltage) of the high voltage energy storage device 44 is applied to the compressor 28, and the direct current voltage (low voltage) of a low voltage energy storage device (not shown) is applied to the other auxiliary devices. The low voltage energy storage device is charged by low voltage electric power which has been stepped down by a step-down converter (not shown) from the high voltage of the energy storage device 44. The fuel cell vehicle 12 travels by the driving force generated by the motor 46.

The fuel cell stack 18 is formed by stacking a plurality of power generation cells 50 together. Each of the power generation cells 50 includes a membrane electrode assembly 52, and separator 53, 54 sandwiching the membrane electrode assembly 52.

Figure 2:
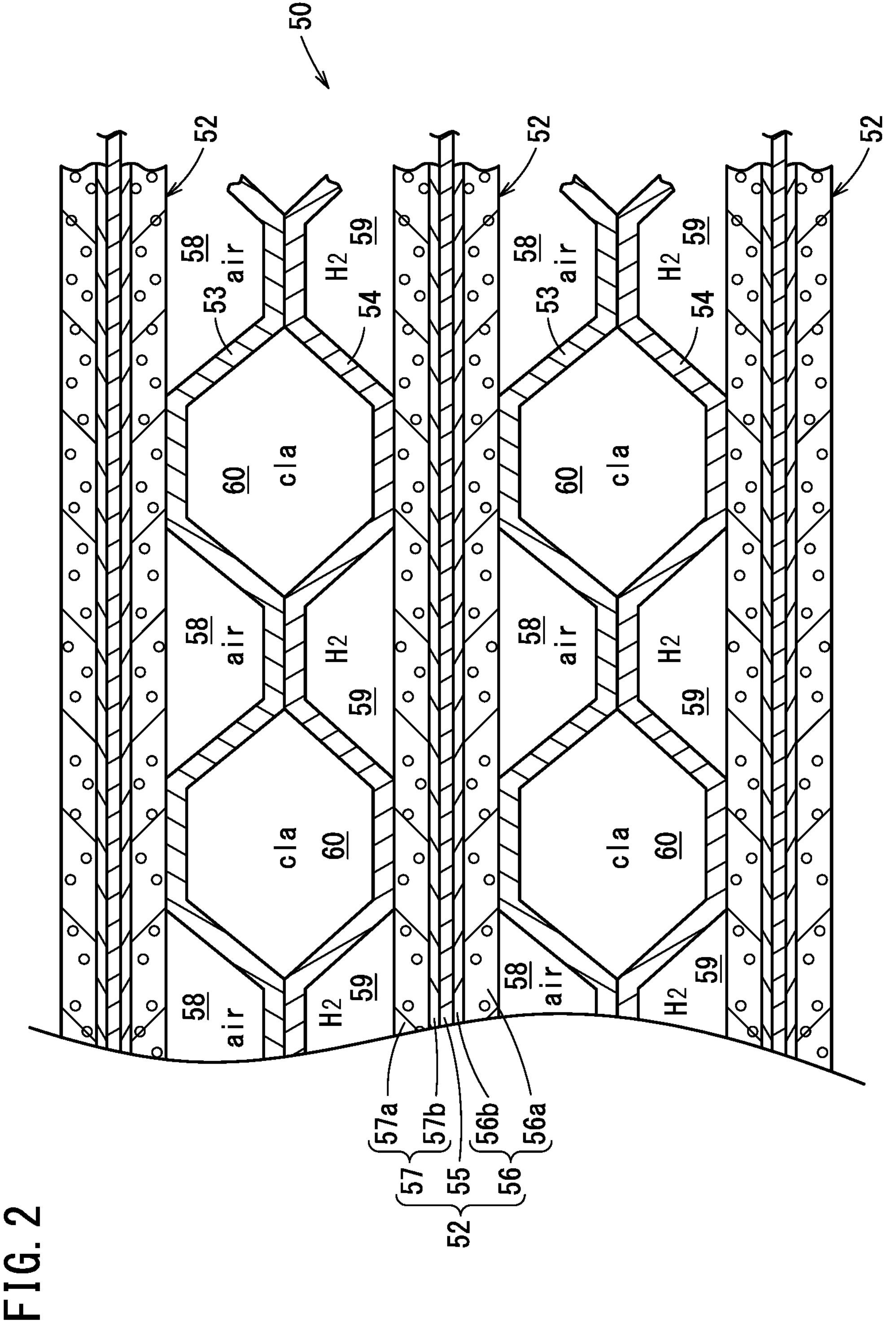
FIG. 2 is a cross sectional view showing a power generation cell schematically drawn in FIG. 1, in some more detail.

For example, the membrane electrode assembly 52 includes a solid polymer electrolyte membrane 55, and a cathode 56 and an anode 57 sandwiching the solid polymer electrolyte membrane 55. The Solid polymer electrolyte membrane 55 is a thin membrane of perfluorosulfonic acid impregnated with water. FIG. 2 is a cross sectional view showing a power generation cell 50 schematically drawn in FIG. 1, in some more detail.

In FIG. 2, each of the cathode 56 and the anode 57 has a gas diffusion layer 56*a*, 57*a* such as a carbon paper. Porous carbon particles on which platinum alloy is supported are deposited uniformly on each surface of the gas diffusion layer 56*a*, 57*a*, and thereby electrode catalyst layers 56*b*, 57*b* are formed on both surfaces of the solid polymer electrolyte membrane 55.

Each of the separators 53, 54 has layout structure where the separators 53, 54 are stacked together in a manner that recesses and ridges of the separators 53, 54 in cross section are arranged side by side sandwiching the membrane electrode assembly 52 between them, such that phases of the recesses and ridges of the separators 53, 54 are shifted from each other by 180° (inverted from each other) in the lateral direction in FIG. 2, and the phases of the recesses and ridges of the separators 53, 54 are inverted from each other in the vertical direction in FIG. 2. In FIG. 2, bottom portions of the separator 53 having a recess shape in cross section and top portions of the separator 54 having a ridge shape contact together to form a seal. The separators 53, 54 have metal bead structure.

The separators 53, 54 are stacked together to form a medium flow field 60 having a hexagonal shape in cross section. Heat exchange medium such as a coolant (denoted by cla in the drawings) flows through the medium flow field 60.

As shown in FIGS. 1 and 2, a cathode flow field (oxygen-containing gas flow field) 58 is formed on a surface of one separator 53 facing the membrane electrode assembly 52. The cathode flow field 58 is connected to an oxygen-containing gas inlet 101 and an oxygen-containing gas outlet 102.

An anode flow field (fuel gas flow field) 59 is formed on a surface of the other separator 54 facing the membrane electrode assembly 52. The anode flow field 59 is connected to a fuel gas inlet 103 and a fuel gas outlet connection port 104.

That is, a fuel gas ($H_2$) flows through the anode flow field 59 formed by the anode 57 and the separator 54 stacked on the anode 57.

An oxygen-containing gas (air) flows through the cathode flow field 58 formed by the cathode 56 and the separator 53 stacked on the cathode 56.

The fuel gas (hydrogen) is supplied to the anode 57 to induce electrode reactions by the electrode catalyst layer 57*b*. As a result, hydrogen ions are produced from hydrogen molecules. The hydrogen ions permeate the solid polymer electrolyte membrane 55 toward the cathode 56, and electrons are released from the hydrogen molecules.

The electrons released from the hydrogen molecules move from a negative electrode terminal 106 toward the cathode 56 through the loads such as the drive unit 42 and the motor 46, and through a positive electrode terminal 108.

At the cathode 56, reactions of the hydrogen ions, the electrons, and the oxygen contained in the oxygen-containing gas are induced by operation of the electrode catalyst layer 56*b*. As a result, water is produced.

A voltage sensor 110 for detecting the power generation voltage Vfc is provided in a wiring line connecting the positive electrode terminal 108 and the negative electrode terminal 106 and the drive unit 42. Further, a current sensor 112 for detecting the generated power generation current Ifc is provided in a wiring line connecting the positive electrode terminal 108 and the drive unit 42.

The compressor 28 comprises a mechanical supercharger, etc. driven by a compressor motor (not shown) to which electric power of the energy storage device 44 is supplied through the drive unit 42. For example, the compressor 28 has a function of sucking the outside air (atmospheric air, air) from an outside air intake port 113, pressuring an outside air, and supplying the pressurized air to the fuel cell stack 18 through the humidifier 30.

The humidifier 30 includes a channel 31A and a channel 31B. An air (oxygen-containing gas) which has been compressed, heated, and dried by the compressor 28 flows through the channel 31A. A discharge gas discharged from the oxygen-containing gas outlet 102 of the fuel cell stack 18 flows through the channel 31B.

The humidifier 30 has a function of humidifying the oxygen-containing gas supplied from the compressor 28. That is, the humidifier 30 moves the water in the exhaust gas (off gas) from the channel 31B to the supply gas (oxygen-containing gas) flowing in the channel 31A through porous membranes in the humidifier 30 for humidification, and supplies the humidified oxygen-containing gas to the fuel cell stack 18 through an oxygen-containing gas inlet 91.

A shutoff valve 114, an air flow sensor (AFS: flow rate sensor) 116, the compressor 28, an input side stop valve 118, and the humidifier 30 are provided in the oxygen-containing gas supply channel 61 (including oxygen-containing gas supply channels 61A, 61B) from the outside air intake port 113 to the oxygen-containing gas inlet 91. The channels such as the oxygen-containing gas supply channel 61 drawn by double lines are in the form of pipes (channels described later are in the form of pipes) as well. The shutoff valve 114 is opened or closed for releasing or interrupting intake of the air into the oxygen-containing gas supply channel 61.

The air flow sensor 116 measures the mass flow rate of the oxygen-containing gas supplied to the fuel cell stack 18 through the compressor 28. The input side stop valve 118 opens/closes the oxygen-containing gas supply channel 61B.

The outside air intake port 113 is provided with a temperature sensor 73 for detecting (measuring/obtaining) the outside air temperature Tair and a pressure sensor 83 for detecting (measuring/obtaining) the atmospheric air pressure Pair.

An oxygen-containing off gas channel 62 connected to an oxygen-containing gas outlet 102 through an oxygen-containing off gas outlet 92 is provided with the humidifier 30 and a discharge side stop valve 120 which also functions as a back pressure valve in the order from the oxygen-containing off gas outlet 92.

A bypass channel 64 connected to the oxygen-containing gas supply channel 61 and the oxygen-containing off gas channel 62 is provided between the inlet port of the input side stop valve 118 and the outlet port of the discharge side stop valve 120. A bypass valve 122 for opening/closing the bypass channel 64 is provided in the bypass channel 64. The bypass valve 122 regulates the flow rate of the oxygen-containing gas bypassing the fuel cell stack 18. A merge channel of the bypass channel 64 and the oxygen-containing off gas channel 62 is connected to a discharge channel 62A.

The hydrogen tank 20 has a solenoid-operated shutoff valve 21. The hydrogen tank 20 is a container containing high purity hydrogen compressed at high pressure.

The fuel gas discharged from the hydrogen tank 20 flows through the shutoff valve 21, the injector 32 and the ejector 34 provided in a fuel gas supply channel 72, and the fuel gas is supplied to the inlet of the anode flow field 59 through a fuel gas inlet 93 and the fuel gas inlet 103 of the fuel cell stack 18. The fuel gas supply channel 72 adjacent to the fuel gas inlet 93 is provided with a pressure sensor 82 for detecting (measuring/obtaining) the inlet pressure in the anode flow field 59 as the anode inlet pressure Pin.

The outlet of the anode flow field 59 is connected to an inlet 151 of the gas liquid separator 36 through the fuel gas outlet connection port 104, a fuel off gas outlet 94, and a fuel off gas channel 74, and the fuel off gas as the hydrogen-containing gas is supplied from the anode flow field 59 to the gas liquid separator 36.

The gas liquid separator 36 separates the fuel off gas into the gas component and the water component (liquid water). The gas component of the fuel off gas (fuel exhaust gas) is discharged from a gas discharge port 152 of the gas liquid separator 36, and when a bleed valve 70 is closed, the gas component is supplied to the air intake port of the ejector 34 through a circulation channel 77.

When the bleed valve 70 is opened, the fuel off gas is supplied to the intake port of the ejector 34 through the circulation channel 77, and supplied also to the oxygen-containing gas supply channel 61B through a connection channel (communication channel) 78 and the bleed valve 70.

The liquid component of the fuel off gas flows from a liquid discharge port 160 of the gas liquid separator 36 through a drain channel 162 having a drain valve 164, and the liquid components are mixed with the exhaust gas discharged from the discharge channel 62A, and discharged to the outside (atmospheric air) through a discharge channel 99 and an exhaust gas discharge port 168.

In fact, part of the fuel off gas (hydrogen-containing gas) is discharged to the drain channel 162 together with the liquid component. In order to dilute the hydrogen gas in the fuel off gas and discharge it to the outside, part of the oxygen-containing gas discharged from the compressor 28 is supplied to the discharge channel 62A through the bypass channel 64.

The bleed valve 70 provided in the connection channel 78 connecting the circulation channel 77 of the fuel off gas to the oxygen-containing gas supply channel 61B is opened during travel of the fuel cell vehicle 12, to prevent degradation of the anode 57 due to the decrease of the hydrogen concentration in the anode flow field 59 when the nitrogen gas in the cathode flow field 58 permeates the membrane electrode assembly 52.

When the bleed valve 70 is opened, the fuel off gas discharged through the gas liquid separator 36 flowing from the fuel cell stack 18 through the fuel off gas channel 74, flows through the connection channel 78, the oxygen-containing gas supply channel 61B, the oxygen-containing gas inlet 91, and the oxygen-containing gas inlet 101 into the cathode flow field 58.

The fuel gas in the fuel off gas flowing through the cathode flow field 58 is ionized into hydrogen ions by the catalyst reaction at the cathode 56, and the hydrogen ions react with the oxygen-containing gas to produce water. The remaining fuel off gas which has not been consumed in the reaction (nitrogen gas and a small amount of unreacted hydrogen gas) is discharged as the oxygen-containing off gas from the oxygen-containing off gas outlet 92 of the fuel cell stack 18, and flows through the oxygen-containing off gas channel 62.

The oxygen-containing off gas flowing through the oxygen-containing off gas channel 62 (containing the remaining fuel off gas which has not been consumed in the reaction) is mixed with the oxygen-containing gas supplied through the bypass channel 64 of the oxygen-containing gas, and the diluted oxygen-containing gas having low concentration of the fuel off gas (containing fuel gas) in the oxygen-containing off gas flows through the discharge channel 62A. The discharge channel 62A is connected to the drain channel 162 and merged with (connected to) the discharge channel 99.

In the discharge channel 99, the oxygen-containing off gas from the discharge channel 62A is used to dilute the fuel gas in the mixed fluid of the liquid water and the fuel off gas that are discharged from the drain channel 162, and the fuel gas is discharged to the atmospheric air outside the fuel cell vehicle 12 through the exhaust gas discharge port 168.

The medium supply apparatus 26 of the fuel cell system 10 has a medium pipe 138 as a passage of the heat exchange medium. A medium supply channel 140 and a medium discharge channel 142 are formed in the medium pipe 138. The heat exchange medium is supplied to the medium flow field 60 (see FIG. 2) of the fuel cell stack 18 through the medium supply channel 140. The heat exchange medium which flowed through the medium flow field 60 of the fuel cell stack 18 is discharged to the medium discharge channel 142.

The radiator 40 is connected between the medium discharge channel 142 and the medium supply channel 140. The radiator 40 cools the heat exchange medium. The medium supply channel 140 is provided with the medium pump 38. The medium pump 38 circulates the heat exchange medium in the circulation channel of the heat exchange medium. The circulation channel of the heat exchange medium includes the medium supply channel 140, the medium flow field 60 (see FIG. 2) in the fuel cell stack 18, the medium discharge channel 142, and the radiator 40.

Temperature sensors (temperature acquisition units) 76, 86 are provided in the medium supply channel 140 and the medium discharge channel 142, respectively. The temperature of the heat exchange medium (medium outlet temperature) Tco detected by the temperature sensor 86 is presumed as the temperature (internal temperature) of the fuel cell stack 18. The temperature sensor 76 detects (measures/obtains) the temperature (medium inlet temperature) Tci of the heat exchange medium. The components of the fuel cell system 10 as described above are controlled by the control device 15 as a whole.

It should be noted that the input side stop valve 118, the discharge side stop valve 120, the bleed valve 70, and the drain valve 164, excluding the shutoff valves 21, 114 as the open/close valves opened/closed by control of the control device 15, are flow rate regulator valves of which opening degrees are controlled by the control device 15. Alternatively, open/close valves may be used as the input side stop valve 118, the discharge side stop valve 120, the bleed valve 70, and the drain valve 164. In this case, duty control is performed.

The control device 15 comprises an ECU (Electronic Control Unit). The ECU comprises a computer including at least one processor (CPU), a memory (storage device), an input/output interface, and an electronic circuit. The at least one processor (CPU) executes computer executable commands or instructions such as programs (not shown) stored in the memory.

The processor (CPU) of the control device 15 controls operation of the fuel cell vehicle 12 and the fuel cell system 10 by performing computation according to the computer executable commands such as the programs.

FIG. 3 is a functional block diagram showing structure of a medium supply apparatus control unit 200 as part of the function of the control device 15 which controls the medium supply apparatus 26 by executing computation according to the computer executable commands such as the programs by the processor.

The medium supply apparatus control unit 200 includes a first flow rate calculation unit 201, a second flow rate calculation unit 202, a maximum value selection unit 204, and a medium pump rotation number command value calculation unit 206.

The first flow rate calculation unit 201 functions as a medium flow rate required value calculation unit in the form of a map (table) for calculating the first flow rate Fr1 [L/min] as the medium flow rate for differential pressure protection between the anode flow field 59 and the medium flow field 60 based on the power generation current Ifc [A] and the medium outlet temperature Tco [° C.].

Figure 4:
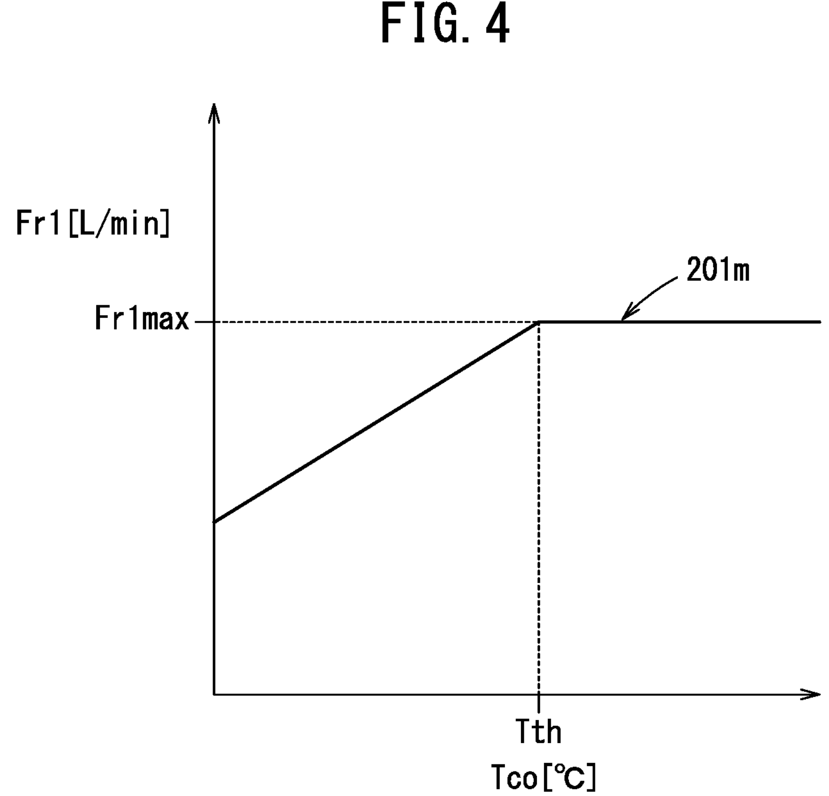
FIG. 4 is a map showing characteristics of a first flow rate for a medium outlet temperature.

As shown in FIG. 4, a map 201*m* for calculating the first flow rate Fr1 [L/min] has characteristics where a value which is decreased in proportion to the decrease of the medium outlet temperature Tco [° C.] is adopted when the medium outlet temperature Tco is less than the threshold temperature Tth, and the maximum flow rate Frimax is adopted when the medium outlet temperature Tco is not less than the threshold value temperature Tth. The internal temperature of the fuel cell stack 18 is presumed to be substantially equal to the medium outlet temperature Tco.

In the case where the maximum value of the internal temperature of the fuel cell stack 18 of the PEFC type is set at a temperature of 100 [° C.] or around 100 [° C.], the threshold value temperature Tth is set to a predetermined temperature in consideration of the power generation efficiency, etc. of the fuel cell stack 18 at temperature lower than the preset temperature.

In the first flow rate calculation unit 201, the power generation current Ifc is referred to for determining whether the power generation amount of the fuel cell stack 18 is less than the predetermined value or not. Even in the case where the power generation current Ifc is not more than the predetermined value, there is a possibility that differential pressure protection is needed assuming that the anode inlet pressure Pin is maintained. Therefore, the first flow rate Fr1 is calculated with reference to the map 201*m*, using the medium outlet temperature Tco.

The second flow rate calculation unit 202 is a medium flow rate required value calculation unit as a theoretical calculation formula for calculating the second flow rate Fr2 as the medium flow rate for cooling the fuel cell stack 18 in accordance with the power generation amount based on the power generation current Ifc and the medium outlet/inlet temperature difference Tdif (Tdif=Tco−Tci).

The theoretical calculation formula for calculating the second flow rate Fr2 has characteristics where the second flow rate Fr2 as the medium flow rate required value becomes large since the medium outlet/inlet temperature difference Tdif=Tco−Tci becomes large in proportion to the power generation current Ifc.

The maximum value selection unit 204 compares the first flow rate Fr1 and the second flow rate Fr2, and selects the larger one of them as the medium flow rate required value Frreq {Frreq(Fr1) or Frreq(Fr2)}, and outputs the medium flow rate required value Frreq to the medium pump rotation number command value calculation unit 206.

The medium pump rotation number command value calculation unit 206 sets the media flow rate required value Frreq to a target flow rate Ftar {Frreq(Fr1)→Ftar(Fr1) or Frreq(Fr2)→Ftar(Fr2)}, and the target rotation number command value Ncom of the medium pump 38 corresponding to the target flow rate Ftar {Ftar(Fr1)→Ncom(Fr1) or Ftar(Fr2)→Ncom(Fr2)} is calculated and outputted to the medium pump 38.

The medium pump 38 is controlled by the control device 15 by feedback control to rotate at a medium pump rotation number N in accordance with the target rotation number command value Ncom.

A power switch (power SW) 71 of the fuel cell vehicle 12 is connected to the control device 15. The power switch 71 starts or continues (ON) or terminates (OFF) the power generation operation of the fuel cell stack 18 of the fuel cell system 10. Further, the control device 15 is also connected to an accelerator pedal sensor (not shown), a vehicle velocity sensor (not shown) and an SOC sensor (not shown) of the energy storage device 44.

The fuel cell stack 18 of the fuel cell vehicle 12 performs power generation in response to the power requirements of the load, such as the motor 46 and an air conditioner while the fuel cell vehicle 12 is in the middle of traveling or idling.

In order to generate the power generation electric power (Ifc×Vfc) in accordance with the power requirements, the control device 15 of the fuel cell system 10 supplies the oxygen-containing gas at the oxygen-containing gas flow rate in accordance with the power requirements from the compressor 28 to the fuel cell stack 18, and supplies the fuel gas at the fuel gas flow rate in accordance with the power requirements from the hydrogen tank 20 to the fuel cell stack 18 through the injector 32.

The fuel cell stack 18 performs power generation by electrochemical reactions of the oxygen-containing gas flowing through the cathode flow field 58 and the fuel gas flowing through the anode flow field 59, and distributes the generated electric power to loads including the motor 46 through the drive unit 42.

In the fuel cell stack 18, during power generation, the oxygen-containing gas pressure in the cathode flow field 58 is set to be lower than the fuel gas pressure in the anode flow field 59. Therefore, differential pressure protection for preventing deformation, etc. of the metal bead structure of separators 53 and 54 is considered between the anode flow field 59 as a passage of the fuel gas and the medium flow field 60 as a passage of the medium that are provided opposite (adjacent) to each other through the separator 54.

[Operation]

Figure 5:
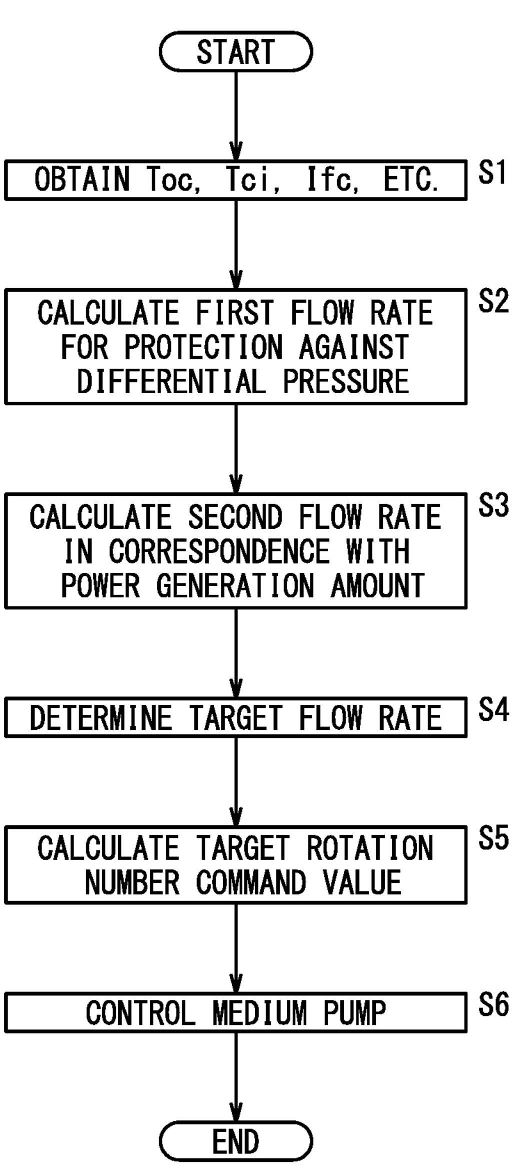
FIG. 5 is a flow chart used for explaining operation of the fuel cell system while a fuel cell vehicle is in the middle of traveling or idling.

The fuel cell system 10 according to the embodiment of the present invention basically has the structure as described above. Hereinafter, with reference to a flow chart in FIG. 5, the protection operation of the differential pressure between the anode flow field 59 and the medium flow field 60 in the fuel cell stack 18 when the power switch 71 is in the ON state (during travel or during idling) will be described. The process of the flow chart in FIG. 5 is repeated in a predetermined cycle by the control device 15.

In step S1, the control device 15 obtains physical quantities related to the current power generation state detected by various sensors, such as the medium outlet temperature Tco detected by the temperature sensor 86, the medium inlet temperature Tci detected by the temperature sensor 76 and the power generation current Ifc detected by the current sensor 112, and the process proceeds to step S2.

In step S2, if the power generation current Ifc is not more than the predetermined value, the first flow rate calculation unit 201 of the control device 15 calculates the first flow rate Fr1 with reference to the map 201*m* of medium flow rates for protection of the differential pressure between the anode flow field 59 and the medium flow field 60 at the media outlet temperature Tco, and the process proceeds to step S3.

In step S3, since the medium inlet/outlet temperature difference Tdif=Tco−Tci increases in proportion to the power generation current Ifc, the second flow rate calculation unit 202 of the control device 15 calculates the second flow Fr2 using a theoretical calculation formula where the second flow Fr2 as the medium flow rate required value increases, and the process proceed to step S4.

In step S4, the maximum value selection unit 204 of the control device 15 determines (selects) the larger one of the first flow rate Fr1 for differential pressure protection or the second flow rate Fr2 for temperature control as the target flow rate Ftar, and the process proceeds to step S5.

Next, the process for determining the target flow rate Ftar will be described.

(i) Determination of the First Flow Rate Fr1

The medium outlet temperature Tco of the heat exchange medium which flowed through the medium flow field 60 in the fuel cell stack 18 changes slowly following changes in the power generation electric power generated by the fuel cell stack 18.

Therefore, under the high load condition where the load resistance of the motor 46, etc. is low, the required power generation electric power (power generation current Ifc) becomes high, the medium outlet temperature Tco becomes high and the pressure in the anode flow field 59 in the fuel cell stack 18 becomes high.

In this case, the map 201*m* is referred to, to ensure that the differential pressure between the pressure in the anode flow field 59 and the pressure in the medium flow field 60 in the fuel cell stack 18 does not increase. If the medium outlet temperature Tco is not less than the threshold temperature Tth, the heat exchange medium is supplied to the medium flow field 60 at a predetermined flow rate, i.e., the maximum flow rate Fr1max herein, to maintain the pressure in the medium flow field 60.

In this manner, it is possible to reduce the differential pressure between the pressure in the anode flow field 59 and the pressure in the medium flow field 60 when the pressure in the anode flow field 59 is high, and provide differential pressure protection which makes it possible to prevent deformation of the metal bead structure of the separators 53 and 54.

On the other hand, in the low load condition where the load resistance value of the motor 46, etc. is high, the required power generation electric power becomes small and if the medium outlet temperature Tco indicating the medium temperature in the medium flow field 60 becomes less than the threshold temperature Tth, the pressure in the anode flow field 59 in the fuel cell stack 18 is decreased. Therefore, for differential pressure protection, the map 201*m* is referred to, for decreasing the pressure in the medium flow field 60, and in correspondence with the decrease of the medium outlet temperature Tco, the medium is supplied at a flow rate which is decreased from the maximum flow rate Fr1max.

Therefore, when the medium outlet temperature Tco is not less than the threshold temperature Tth, the heat exchange medium is supplied to the medium flow field 60 at a predetermined flow rate (maximum flow rate Fr1max in this embodiment), and if the medium outlet temperature Tco is less than the threshold temperature Tth, as the medium outlet temperature Tco decreases, the medium is supplied at a flow rate decreased from the predetermined flow rate. In this manner, it is possible to prevent the differential pressure between the anode flow field 59 and the medium flow field 60 in the fuel cell stack 18 from being increased. As a result, it is possible to prevent deformation, etc. of the metal bead structure of the separators 53 and 54, and protect the fuel cell stack 18 (power generation cells 50) properly.

(ii) Regarding Determination of the Second Flow Rate Fr2

In order to release or dissipate an amount of heat generated in the fuel cell stack 18 by power generation of the fuel cell stack 18 from the radiator 40, the medium flow rate (medium pump rotation number N) is increased or decreased in proportion to the power generation electric power (power generation current Ifc), and the system is controlled in a manner that the medium inlet/outlet temperature difference Tdif=Tco−Tci is kept within a predetermined temperature range.

It is assumed that in the state where the power generation electric power continues, the medium outlet temperature Tco is high, the medium flow rate is comparatively high, and for example, the depressed amount of the accelerator pedal is sharply reduced, and this state is maintained. In this case, the medium flow rate (medium pump rotation number N) is reduced under control in a manner that the heat dissipation from the radiator 40 is reduced and the medium inlet/outlet temperature difference Tdif=Tco−Tci is kept within the predetermined temperature range. In this case, the medium flow rate is maintained at the upper temperature protection required rotation number Nreq in a manner that the deviation between the anode inlet pressure Pin and the medium pressure does not increase. In this manner, the second flow rate Fr2 is determined. Also in this case, it is possible to prevent deformation, etc. of the metal bead structure of the separators 53 and 54, and protect the fuel cell stack 18 (power generation cells 50) properly.

When the medium pump rotation number N at the second flow Fr2 is kept at the upper temperature protection required rotation number Nreq, if the medium outlet temperature Tco is decreased below the threshold temperature Tth, the medium pump rotation number N is switched to rotation number control by the first flow rate Fr1 for protection against the differential pressure.

Referring back to the flow chart, in step S5, the medium pump rotation number command value calculation unit 206 of the control device 15 calculates the target rotation number command value Ncom of the medium pump 38 based on the target flow rate (target media flow rate) determined (selected) in step S4. In step S6, the control device 15 controls the medium pump 38 in a manner that the medium pump rotation number N of the medium pump 38 becomes the target rotation number command value Ncom calculated in step S5.

[Description Using Timing Chart]

An example of operation described with reference to the flow chart in FIG. 5 will be described with reference to the timing chart in FIG. 6 (timing chart during traveling of the fuel cell vehicle 12). Firstly, the process of calculating the target rotation number command value Ncom(Fr2) based on the second flow rate Fr2 denoted by a broken line will be described.

At time t1, when the power generation current Ifc of the fuel cell stack 18 drops sharply in response to a sharp deceleration operation such as releasing of the accelerator pedal, the target rotation number command value Ncom (Fr2) decreases in proportion to the medium outlet temperature Tco between time t1 and time t2.

However, if the target rotation number command value Ncom(Fr2) has decreased to the predetermined upper temperature protection required rotation number Nreq of the fuel cell stack 18, the target rotation number command value Ncom(Fr2) is set to the upper temperature protection required rotation number Nreq (time t2 to time t4).

At time t4, when the power generation current Ifc increases rapidly in response to a sudden acceleration operation such as depressing the accelerator pedal suddenly, the target rotation number command value Ncom(Fr2) increases in proportion to the medium outlet temperature Tco between time t4 and time t7.

However, after time t7 when the target rotation number command value Ncom(Fr2) becomes the maximum rotation number Nmax of the medium pump 38, the target rotation number command value Ncom(Fr2) is set to the maximum rotation number Nmax.

Next, the process of calculating the target rotation number command value Ncom(Fr1) based on the first flow rate Fr1 denoted by a solid line will be described. From time t0 to time t3, since the medium outlet temperature Tco is not less than the threshold temperature Tth, the rotation number command value Ncom(Fr1) is set to the maximum rotation number Nmax.

From time t3 to time t5, the medium outlet temperature Tco is less than the threshold temperature Tth and is gradually decreased. Therefore, the target rotation number command value Ncom(Fr1) is gradually decreased from the maximum rotation number Nmax in proportion to the decrease of the medium outlet temperature Tco.

From time t5 to point t6, the medium outlet temperature Tco is less than the threshold temperature Tth and the medium outlet temperature Tco is gradually increased. Therefore, the target rotation number command value Ncom (Fr1) is increased in proportion to the increase of the medium outlet temperature Tco.

After time t6, the medium outlet temperature Tco is not less than the threshold temperature Tth. Therefore, the target rotation number value Ncom(Fr1) is set to the maximum rotation number Nmax.

Figure 6:
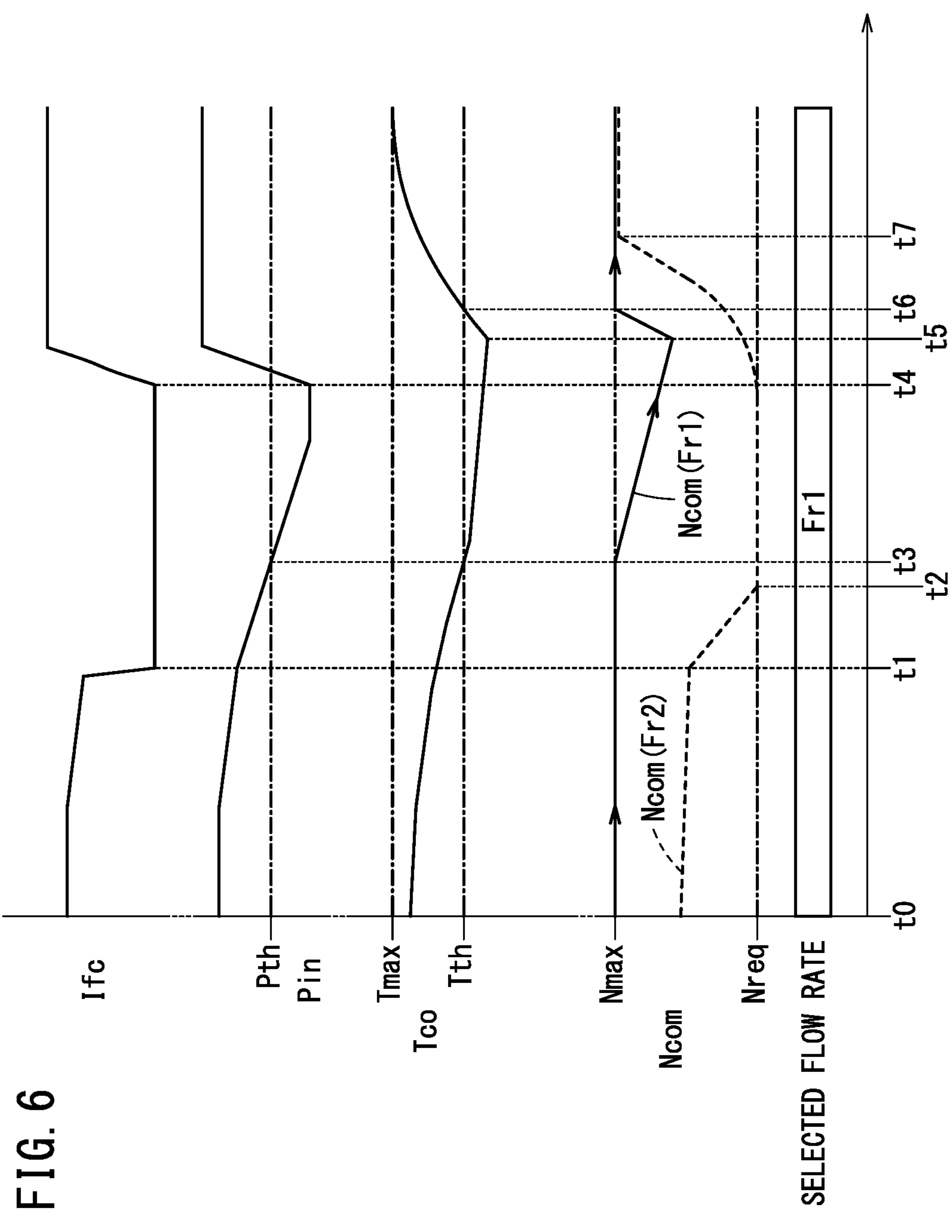
FIG. 6 is a timing chart showing one example of operation described with reference to a flow chart of FIG. 5.

In the example shown in the timing chart in FIG. 6, all the selected flow rates are selected for control by the first flow rate Fr1, but if the medium outlet temperature Tco decreases and control by the second flow rate Fr2 is selected, control is switched to control by the target rotation number command value Ncom(Fr2).

Based on the timing chart of FIG. 6, if the medium outlet temperature Tco is not less than the threshold temperature Tth, the control device 15 sets the maximum flow rate (sets the maximum rotation number Nmax to the target rotation number command value Ncom of the medium pump 38) to the predetermined flow rate, and supplies the heat medium to the medium flow field 60 at the maximum flow rate. Alternatively, when the rate of increase speed of the anode inlet pressure Pin of the anode flow field 59 becomes not less than a predetermined speed or when the anode inlet pressure Pin becomes not less than a predetermined pressure Pth (time t4 to time t6), the medium supply apparatus 26 may be operated at the maximum flow rate (operated using the target rotation number command value Ncom of the medium pump 38 set to the maximum rotation number Nmax).

In this manner, when the anode inlet pressure Pin in the anode flow field 59 is likely to be a large pressure, or when the anode inlet pressure Pin in the anode flow field 59 is not less than the predetermined pressure Pth, it is possible to increase the pressure in the medium flow field 60 by supplying the medium from the medium supply apparatus 26 to the medium flow field 60 in the fuel cell stack 18 at the maximum flow rate. Therefore, it is possible to provide protection against the differential pressure between the pressure in the anode flow field and the pressure in the medium flow field quickly and properly. That is, it is possible to prevent deformation, etc. of the metal bead structure of the separators 53 and 54, and it is possible to protect the fuel cell stack 18 (power generation cells 50) properly.

Modified Embodiment

Figure 7:
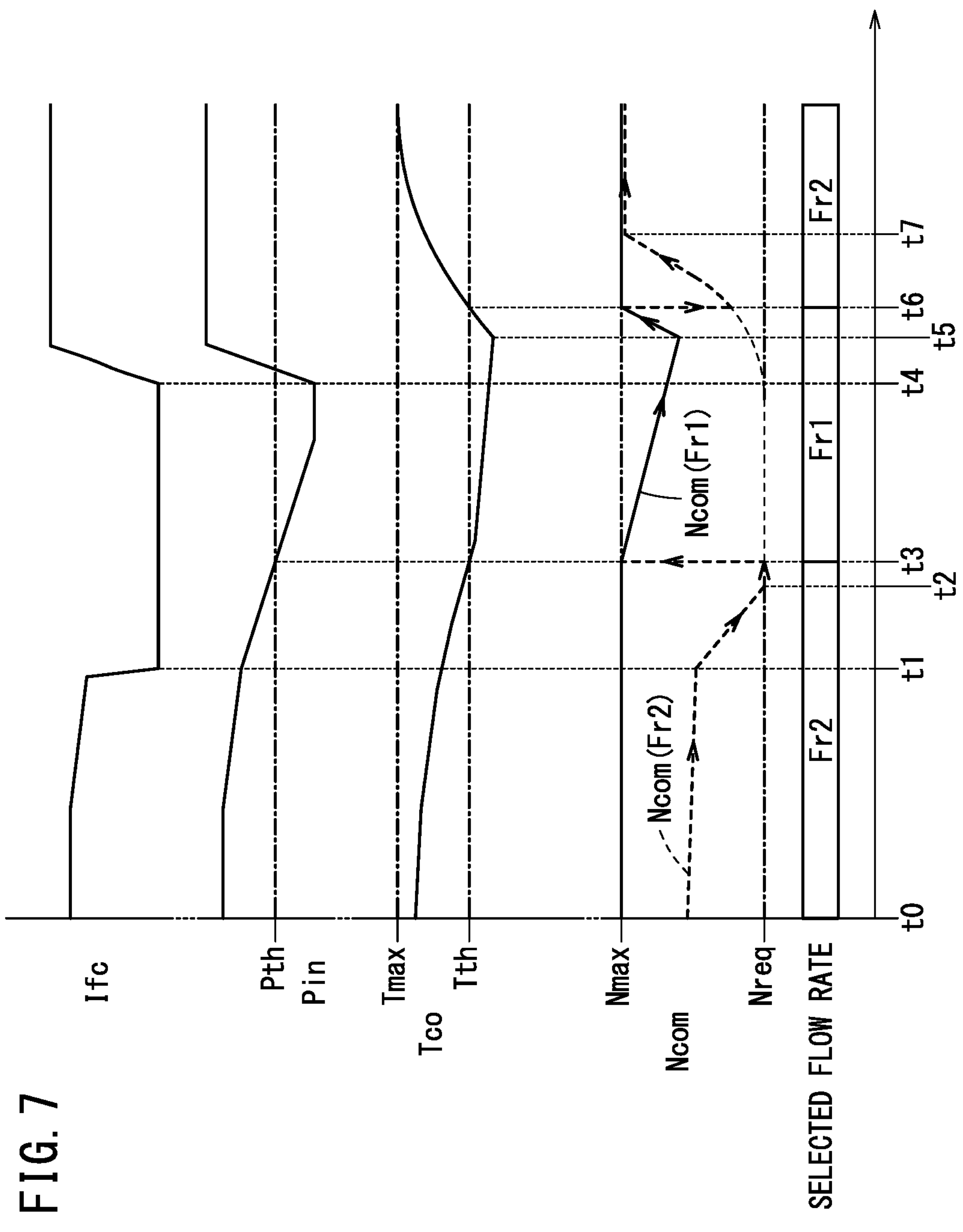
FIG. 7 is a timing chart showing one example of operation of a modified embodiment.

The above embodiment can be modified as follows. FIG. 7 is a timing chart showing one example of operation of a modified embodiment. In this modified embodiment, the same hardware structure as in the case of the fuel cell system 10 shown in FIG. 1 is adopted, and only the control is changed.

In this modified embodiment, from time t0 to time t3, the medium pump 38 is driven using a target rotation number command value Ncom(Fr2) denoted by a broken line with arrows. From time t3 to time t6, the medium pump 38 is driven using a target rotation number command value Ncom (Fr1) denoted by a solid line with arrows. After time t6, again, the medium pump 38 is driven using the target rotation number command value Ncom(Fr2) denoted by the broken line with arrows.

In other words, from time t1 to time t3, even during deceleration, in the case where the medium outlet temperature Tco is not less than the threshold temperature Tth, the maximum value selection unit 204 controls the medium pump 38 using the target rotation number command value Ncom(Fr2) related to the second flow rate Fr2 to maintain the medium pressure at a certain level or more.

From time t3 to time t6, the anode inlet pressure Pin is decreased, and the medium outlet temperature Tco becomes not more than the threshold temperature Tth. Therefore, the medium pump 38 is controlled using the target rotation number command value Ncom(Fr1) related to the first flow rate Fr1 to maintain the medium pressure at a certain level or more.

From time t4 to time t7 and after time t7, even during re-acceleration, when the medium outlet temperature Tco is not more than the threshold temperature Tth, control is performed to maintain the medium pressure at the certain level or more. Therefore, from time t4 to time t6, the medium pump 38 is controlled using the target rotation number command value Ncom(Fr1) denoted by a solid line related to the first flow rate Fr1. After time t6, since the anode inlet pressure Pin became large, the medium pump 38 is controlled using the target rotation number command value Ncom(Fr2) denoted by a broken line related to the second flow rate Fr2.

As described above, in the modified embodiment, during power generation of the fuel cell stack 18, based on the burden of the load and the medium outlet temperature Tco, control is performed to prevent increase in the differential pressure between the anode inlet pressure Pin and the medium pressure which is in proportion to the target rotation number command value Ncom. In this manner, for example, deformation of the metal bead structure of the separators 53, 54 is prevented, and the fuel cell stack 18 is protected.

Invention Understood from Embodiments

Hereinafter, the invention understood from the above embodiments will be described. For ease of understanding, some of constituent elements are labelled with reference numerals used in the above embodiments. However, the present invention is not limited to the particular labelled constituent elements.

(1) The fuel cell system 10 according to the present invention includes the fuel cell stack 18 including the plurality of stacked power generation cells 50. Each of the power generation cells includes the membrane electrode assembly 52 and separators 53, 54 sandwiching the membrane electrode assembly. The membrane electrode assembly includes the cathode 56, the anode 57, and the solid polymer electrolyte membrane 55 interposed between the cathode and the anode. The anode flow field 59 configured to allow a fuel gas to flow along the anode, the cathode flow field 58 configured to allow an oxygen-containing gas to flow along the cathode, and the medium flow field 60 configured to allow a heat exchange medium to flow adjacent to the anode flow field and the cathode flow field, are formed in the separators. The fuel cell system further includes the medium supply apparatus 26 configured to supply the heat exchange medium to the medium flow field in the fuel cell stack through the medium inlet pipe, and collect and cool the heat exchange medium which flowed inside the fuel cell stack through the medium outlet pipe, the temperature acquisition unit 86 configured to obtain the temperature of the heat exchange medium in the medium outlet pipe or the temperature correlated with the temperature of the heat exchange medium in the medium outlet pipe as a medium outlet temperature, and the control device 15 configured to control the medium supply apparatus. The control device is configured to, if the medium outlet temperature is not less than a threshold temperature, supply the heat exchange medium to the medium flow field at a predetermined flow rate, and if the medium outlet temperature is less than the threshold temperature, decrease the predetermined flow rate in correspondence with the decrease of the medium outlet temperature and supply the heat exchange medium to the medium flow field at the flow rate decreased from the predetermined flow rate.

As described above, if the medium outlet temperature is not less than the threshold temperature, the heat exchange medium is supplied to the medium flow field of the fuel cell stack at the predetermined flow rate, and if the medium outlet temperature is less than the threshold temperature, in correspondence with the decrease of the medium outlet temperature, the heat exchange medium is supplied to the medium flow field at a flow rate decreased from the predetermined flow rate. In this manner, it is possible to prevent increase in the differential pressure between an anode flow field and the medium flow field in the fuel cell stack to properly protect the fuel cell stack.

(2) Further, in the fuel cell system, the control device may be configured to, if the medium outlet temperature is not less than the threshold temperature, supply the heat exchange medium to the medium flow field at the predetermined flow rate, and if the medium outlet temperature is less than the threshold temperature, compare the first flow rate Fr1 by first flow rate control for decreasing a supply flow rate from the predetermined flow rate in correspondence with the decrease of the medium outlet temperature, and the second flow rate Fr2 by second flow rate control for increasing and decreasing the supply flow rate in accordance with the increase and decrease of power generation electric power of the fuel cell stack, and control the medium supply apparatus to control the supply flow rate to the larger one of the first flow rate or the second flow rate.

In this manner, by the control of the medium supply apparatus, it is possible to perform both of the first flow rate control related to differential pressure protection where the fuel cell stack is protected by preventing excessive increase of the differential pressure between the pressure in the anode flow field and the pressure in the medium flow field in the fuel cell stack and the second flow rate control related to the temperature protection of the fuel cell stack.

(3) Further, in the fuel cell system, the control device may regulate the predetermined flow rate for supplying the heat exchange medium to the medium flow field, to the maximum flow rate, and if the increase speed of the anode inlet pressure Pin in the anode flow field becomes not less than the predetermined speed or if the inlet pressure becomes not less than the predetermined pressure, the control device may allow the medium supply apparatus to supply the heat exchange medium at the maximum flow rate.

In this manner, when the inlet pressure in the anode flow field is likely to become large, or become not less than the predetermined pressure, it is possible to increase the pressure in the medium flow field by regulating the pressure in the medium supplied from the medium supply apparatus to the medium flow field to the maximum flow rate. Therefore, it is possible to quickly and properly perform protection against the differential pressure between the pressure in the anode flow field and the pressure in the medium flow field.

The present invention is not limited to the above disclosure, and various modifications are possible without departing from the essence and gist of the present invention.

The invention claimed is:

1. A fuel cell system comprising a fuel cell stack including a plurality of stacked power generation cells, the power generation cells each comprising a membrane electrode assembly and separators sandwiching the membrane electrode assembly, the membrane electrode assembly comprising a cathode, an anode, and a solid polymer electrolyte membrane interposed between the cathode and the anode, wherein an anode flow field configured to allow a fuel gas to flow along the anode, a cathode flow field configured to allow an oxygen-containing gas to flow along the cathode, and a medium flow field configured to allow a heat exchange medium to flow adjacent to the anode flow field and the cathode flow field, are formed in the separators, the fuel cell system further comprising:

a medium supply apparatus configured to supply the heat exchange medium to the medium flow field in the fuel cell stack through a medium inlet pipe, and collect and cool the heat exchange medium which flowed inside the fuel cell stack, through a medium outlet pipe;

a temperature acquisition unit configured to obtain a temperature of the heat exchange medium in the medium outlet pipe or a temperature correlated with the temperature of the heat exchange medium in the medium outlet pipe, as a medium outlet temperature; and one or more processors that execute computer-executable instructions stored in a memory, wherein the one or more processors execute the computer-executable instructions to cause the fuel cell system to:

control the medium supply apparatus;

if the medium outlet temperature is not less than a threshold temperature, supply the heat exchange medium to the medium flow field at a predetermined flow rate;

if the medium outlet temperature is less than the threshold temperature, decrease the predetermined flow rate in correspondence with a decrease of the medium outlet temperature and supply the heat exchange medium to the medium flow field at a flow rate decreased from the predetermined flow rate;

if the medium outlet temperature is not less than the threshold temperature, supply the heat exchange medium to the medium flow field at the predetermined flow rate;

if the medium outlet temperature is less than the threshold temperature, compare a first flow rate by a first flow rate control for decreasing a supply flow rate from the predetermined flow rate, in correspondence with the decrease of the medium outlet temperature, and a second flow rate by second flow rate control for increasing and decreasing the supply flow rate, in accordance with an increase and decrease of power generation electric power of the fuel cell stack; and control the medium supply apparatus to control the supply flow rate to larger one of the first flow rate or the second flow rate.

2. A fuel cell system comprising a fuel cell stack including a plurality of stacked power generation cells, the power generation cells each comprising a membrane electrode assembly and separators sandwiching the membrane electrode assembly, the membrane electrode assembly comprising a cathode, an anode, and a solid polymer electrolyte membrane interposed between the cathode and the anode, wherein an anode flow field configured to allow a fuel gas to flow along the anode, a cathode flow field configured to allow an oxygen-containing gas to flow along the cathode, and a medium flow field configured to allow a heat exchange medium to flow adjacent to the anode flow field and the cathode flow field, are formed in the separators, the fuel cell system further comprising:

a medium supply apparatus configured to supply the heat exchange medium to the medium flow field in the fuel cell stack through a medium inlet pipe, and collect and cool the heat exchange medium which flowed inside the fuel cell stack, through a medium outlet pipe;

a temperature acquisition unit configured to obtain a temperature of the heat exchange medium in the medium outlet pipe or a temperature correlated with the temperature of the heat exchange medium in the medium outlet pipe, as a medium outlet temperature; and one or more processors that execute computer-executable instructions stored in a memory, wherein the one or more processors execute the computer-executable instructions to cause the fuel cell system to:

control the medium supply apparatus;

if the medium outlet temperature is not less than a threshold temperature, supply the heat exchange medium to the medium flow field at a predetermined flow rate;

if the medium outlet temperature is less than the threshold temperature, decrease the predetermined flow rate in correspondence with a decrease of the medium outlet temperature and supply the heat exchange medium to the medium flow field at a flow rate decreased from the predetermined flow rate;

regulate the predetermined flow rate for supplying the heat exchange medium to the medium flow field, to a maximum flow rate; and if an increase speed of inlet pressure in the anode flow field becomes not less than a predetermined speed or if the inlet pressure becomes not less than a predetermined pressure, allow the medium supply apparatus to supply the heat exchange medium at the maximum flow rate.

* * * * *